United States Patent [19]  [11] 4,410,066
Swett  [45] Oct. 18, 1983

[54] TREE STAND APPARATUS

[76] Inventor: George W. Swett, Rte. 1, Epps, La. 71237

[21] Appl. No.: 290,613

[22] Filed: Aug. 6, 1981

[51] Int. Cl.³ .................... A01M 31/02; A45F 3/26; A47C 9/10
[52] U.S. Cl. .................................. 182/135; 182/187
[58] Field of Search ............ 182/135, 187, 188, 222, 182/48, 20, 129; 43/1

[56] References Cited

U.S. PATENT DOCUMENTS

| | | | |
|---|---|---|---|
| 2,854,705 | 10/1958 | McClaran | 43/1 |
| 3,018,857 | 1/1962 | Parham | 43/1 |
| 3,067,975 | 12/1962 | Wilcox | 182/187 |
| 3,289,787 | 12/1966 | McSwain | 182/20 |
| 3,419,108 | 12/1968 | Mobbs | 182/187 |
| 3,460,649 | 8/1969 | Baker | 182/187 |
| 3,485,320 | 12/1969 | Jones | 182/187 |
| 3,856,111 | 12/1974 | Baker | 182/187 |
| 3,927,733 | 12/1975 | Wurn | 182/187 |
| 3,955,645 | 5/1976 | Dye | 182/187 |
| 3,990,536 | 11/1976 | Wilburn | 182/187 |
| 4,069,891 | 1/1978 | McClung | 182/187 |
| 4,134,474 | 1/1979 | Stavenau | 182/187 |
| 4,168,765 | 9/1979 | Ferguson | 182/187 |
| 4,246,981 | 1/1981 | Stavenau | 182/116 |

FOREIGN PATENT DOCUMENTS

WO80/00794  1/1980  PCT Int'l Appl. ................. 182/135

Primary Examiner—Reinaldo P. Machado
Assistant Examiner—Alvin C. Chin-Shue
Attorney, Agent, or Firm—Charles C. Garvey, Jr.

[57] ABSTRACT

An enclosed deer stand climber apparatus provides a covered frame having a top, a bottom space therefrom and a plurality of side walls defining an enclosure therebetween with the rearmost of the side walls normally being adjacent a tree to which the frame is attached. An opening is provided in the bottom and a closure means for sealing the opening. A folding seat is mounted on the frame and within the enclosure between a first folded climbing position removed from a vertical path generally above the opening to a second operating position vertically above the opening. Upper and lower climbing brackets are provided on the frame which transfer load to the tree and grip it. A tree gripping member separate from the frame and providing a means for attachment to the feet of the operator is provided. During operation, the entire frame can be elevated by a single operator and after placement provides an entirely enclosed protective tree stand protecting the inhabitant from wind, cold and rain.

10 Claims, 7 Drawing Figures

TREE STAND APPARATUS

BACKGROUND OF THE INVENTION

1. Technical Field

The present invention relates to climber-type hunting platforms such as deer stands and the like, and more particularly relates to a hand climber-type deer stand which protectively covers the hunter or observer during foul weather.

2. General Background

During activities as hunting, photography, the observation of wildlife, or the like, it is often desirable for the participant to be elevated a distance above the earth's surface by occupying a position a number of feet above the ground on a tree, a pole or the like.

In remote wooded or forest areas, elevation above the ground can be a problem, since an elevated platform cannot often be easily constructed. Permanent structures are usually not mobile, restricting the user to a single location on subsequent trips. One solution is to ascend a selected tree found at the place in the forest or wooded area where the user wishes to operate.

Various devices have been patented which have attempted to solve this problem by elevating an observer, hunter or the like a distance above the ground where he is able to observe a large amount of surrounding territory while being somewhat hidden from game animals which occupy the underlying terrain.

In U.S. Pat. No. 3,856,111 issued to James E. Baker there is provided a "Hand Climber Accessory for Tree Climbing Hunting Platforms" which attempts to solve the problem of providing an elevated platform from which hunters could pursue their sport.

U.S. Pat. No. 4,168,765 issued to Clarance Furgerson provides a "Hand Climber for Use with Tree Climing Platform".

In U.S. Pat. No. 4,069,891 there is seen an Observation Stand which could be used for primarily hunting deer, the stand including a supporting frame which is attached around a tree to provide a pair of vertically aligned trunions. The trunions receive a rotatable housing which can be manipulated by a person's foot. The housing also includes removable panels, the upper panels being transparent.

A portable enclosure is seen in U.S. Pat. No. 3,990,536 with the enclosure providing a backrest, a seat, and a canopy which are all supported.

U.S. Pat. No. 3,460,649, issued to James E. Baker, the same inventor of U.S. Pat. No. 3,856,111, shows a Tree Climbing—Hunting Platform.

U.S. Pat. No. 3,419,108 issued to F. L. Mobbs provides a Portable Tree Stand.

Another portable tree stand is seen in U.S. Pat. No. 3,485,320 issued to T. V. Jones.

A U-shaped rail is mounted on a frame and a shroud encloses the tree stand in a device shown in U.S. Pat. No. 4,134,474.

A tree climbing stand and loop is disclosed in U.S. Pat. No. 3,955,645.

The above patents describe structures designed to climb the tree but afford little or no protection to the occupant once the tree is an elevated position. Many of these devices are used during the harshest portion of the year, namely in the winter, and are used at an elevation where wind chill factors are elevated from that at ground level. The result of all this is that hunters are often subjected to the hazards of high winds, temperature, rain, and the like. This becomes accutely dangerous in the case of a hunter who might be elderly, handicapped, or of more frail stature.

The present invention solves these prior art problems and shortcomings by providing an enclosed deer stand structure which still allows the hunter to ascend a tree with the apparatus.

DISCLOSURE OF INVENTION

The present invention provides an enclosed deer stand tree climber apparatus having a covered frame with the frame providing a top, a bottom spaced therefrom and a plurality of side walls defining an enclosure therebetween, the rearmost of the side walls normally being adjacent a tree to which the frame is normally attached. An opening is provided in the bottom or floor of the apparatus with closure means for sealing the opening after the hunter has ascended a tree with the structure. A folding seat is mounted on the frame and between a first folded climbing position removed from a vertical path generally above the opening to a second operating position vertically above the opening. A lower climbing bracket is affixed to the frame at the bottom, the lower climber bracket providing a tree gripping surface for transferring load to a tree at the surface thereof adjacent the frame. An upper climbing bracket is provided affixed to the frame at its upper portion, the climbing bracket providing a tree gripping surface for transferring load from the structure to a tree at the surface thereof opposite the frame. A tree gripping climbing member separate from the frame provides means for attachment to the feet of an operator. The operator ascends the tree by grasping the frame with his hands and by attaching his feet to the lower tree gripping climbing member. Extensions of the body from a crouched to an extended position while bearing against the tree climbing member elevates the upper frame structure while the lower tree gripping climber member is elevated to a higher position on the tree by the operator holding onto the covered frame while lifting his feet as attached to the tree gripping climbing member.

In the preferred embodiment the folding seat is pivotally affixed to the rearmost side wall portion of the enclosure. In the preferred embodiment the closure means is a trap door removably covering the opening. A top can be movably attached to the frame thus allowing the occupant to stand up in a fully outstretched position.

The top is preferably pivotally attached at one edge portion to one of the side walls at its upper edge.

The upper climbing bracket provides a pair of spaced apart supportive sub-frames each extending from a position adjacent the tree to which the frame attaches. The sub-frames are preferably rectangular. The opening is generally adjacent the rearmost side wall.

The frame is covered in part by a normally permanent lower siding portion extending generally from the bottom and upwardly a distance greater than one-half the height of the frame. In part, the frame is covered by a multipart fabric covering which fabric parts can be laterally displaced to form openings therebetween.

Thus it is an object of the present invention to provide a deer stand tree climbing apparatus which can be elevated by the operator and yet forms a complete enclosure around the operator during use in an elevated position.

Another object of the present invention is to provide a tree climbing apparatus which is easy to construct and simple to maintain and use.

Another object of the present invention is to provide a tree climbing apparatus which is versatile, allowing observation in a number of directions and under various conditions and circumstances.

Another object of the present invention is to provide a hand climber-type tree climbing platform which is fully enclosed affording protection for the occupant from the wind, rain, and cold.

Another object of the present invention is to provide a tree climbing-type hunting and observation platform which can ascend or descend a tree or poll while being operated by a sole individual.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
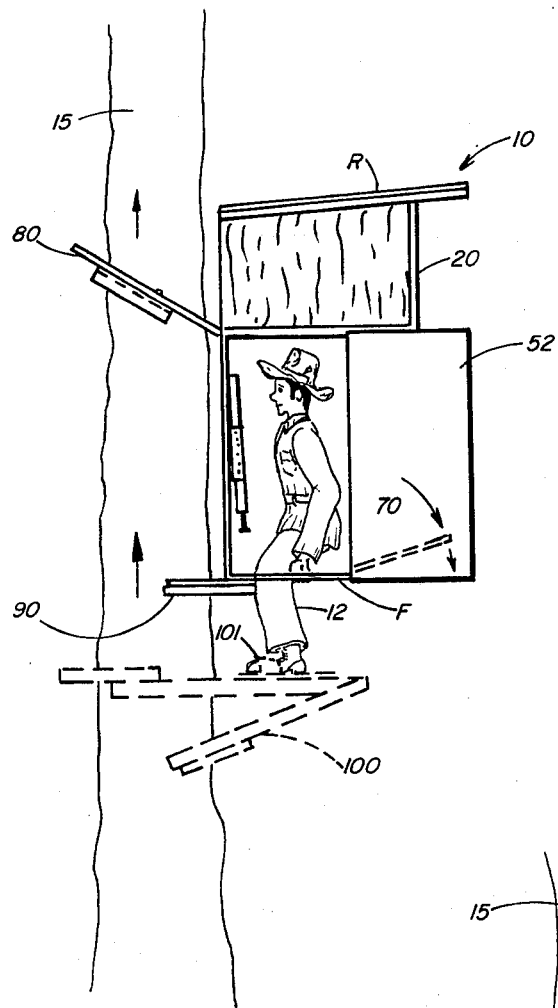
FIG. 1 is a side elevational view of the preferred embodiment of the apparatus of the present invention showing ascension of a tree during operation.
Figure 2:
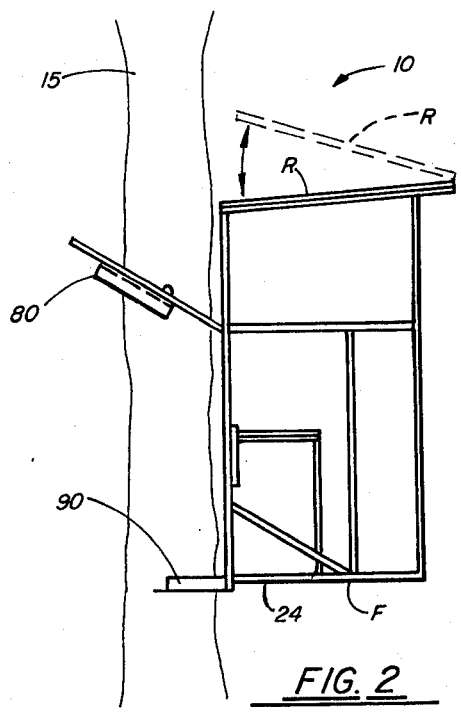
FIG. 2 is a side view of the preferred embodiment of the apparatus of the present invention illustrating the apparatus in ascended operating position.

FIGS. 1 and 2 illustrate best the preferred embodiment of the apparatus of the present invention designated generally by the numeral 10, wherein there is seen schematically illustrated a tree 15 and more particularly the trunk portion thereof which would normally be climbed by user 12 elevating apparatus 10 during operation, and thereafter support apparatus 10 at a desired elevation.

Tree climber stand apparatus 10 provides generally a support frame 20 constructed of a plurality of connected frame members which can be of welded, for example, construction.

Frame 20 defines an enclosure having floor F constructed of a plurality of frame members 21-27. Each frame member 21-27 could be, for example, aluminum tubing, square or rectangular in section. Floor F is covered by a surface S which extends over the area within members 21-24 with an opening 40 being formed adjacent member 23 and tree 15. Opening 40 allows operator 12 to extend partially therethrough (FIG. 1) during the climbing operation, allowing variation in the relative vertical position of operator 12 and frame 20 with respect to each other and tree 15.

Figure 7:
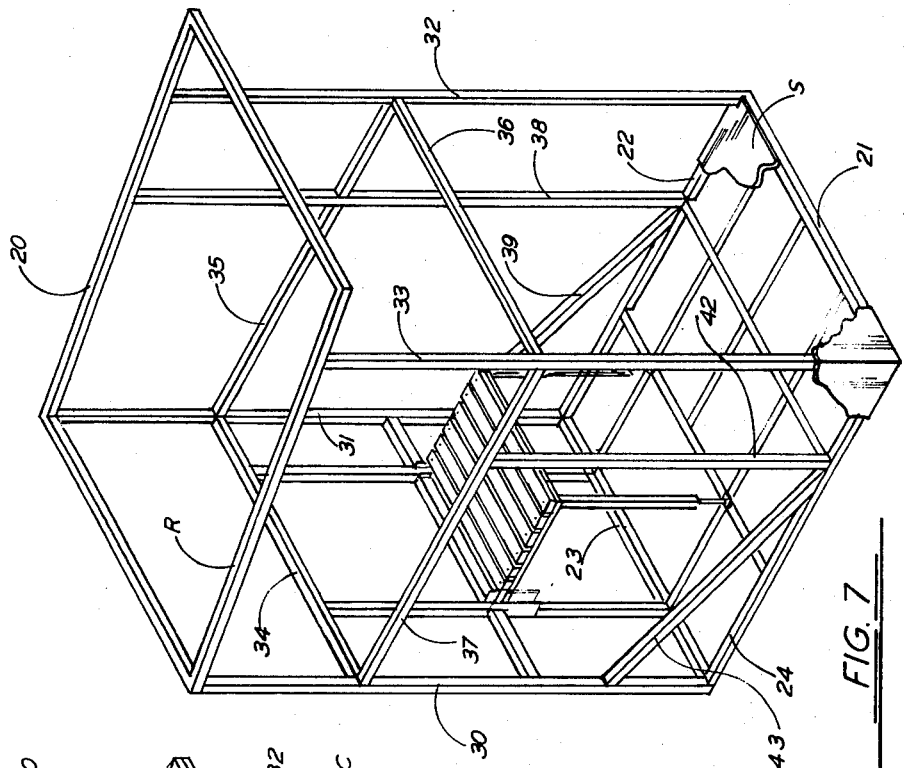
FIG. 7 is a partial perspective view of the preferred embodiment of the apparatus of the present invention illustrating the frame portion thereof.
Figure 6:
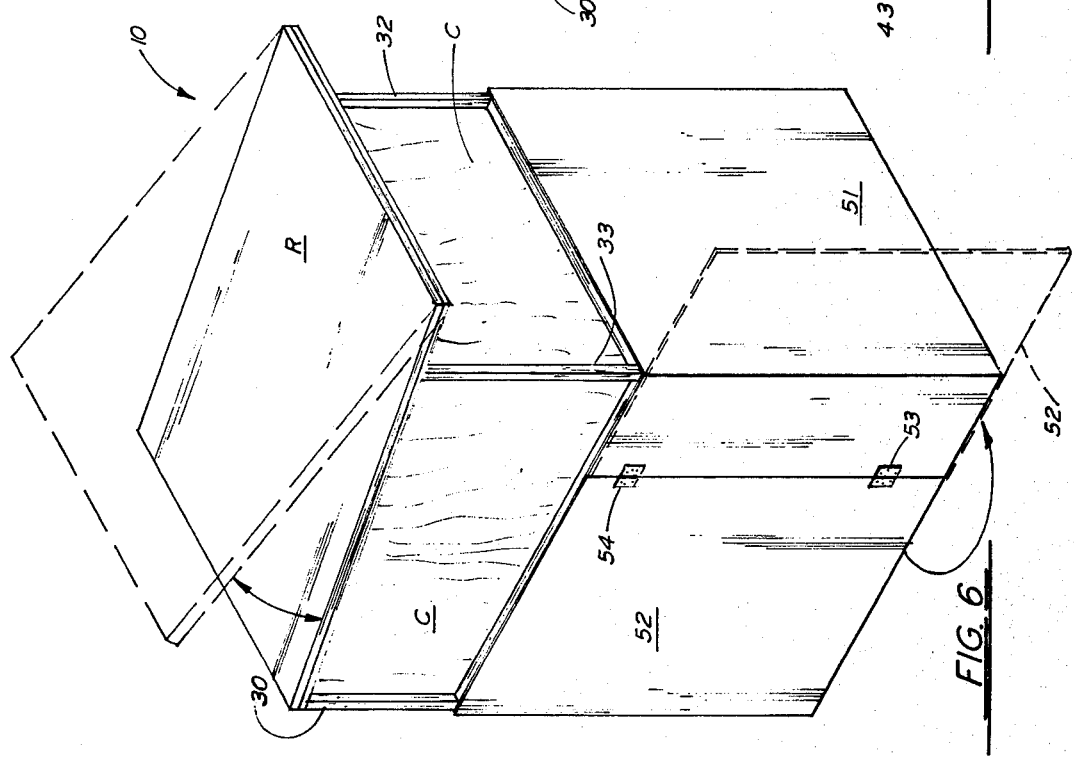
FIG. 6 is a perspective view of the preferred embodiment of the apparatus of the present invention with the climbing portions removed for purposes of illustration.

Roof support frame R is of similar construction to floor F and is connected to floor F and spaced therefrom by a movable, pivotable connection to corner columns 32, 33. Intermediate horizontal braces 35, 37 and intermediate vertical braces 38, 42 add rigidity to each lateral side wall. It should be understood that the side wall frame of FIG. 2 could be similarly used to construct four side walls, each terminating at its lower edge at frame members 21, 22, 23, and 24. Thus, an enclosure within frame 20 would be provided as defined by floor frame F, roof frame R, and four side walls. This entire frame 20 arrangement is seen in FIG. 7 while FIG. 6 shows a perspective view with frame 20 being covered by siding 51, door 52, roof R and removable curtains C.

Figure 4:
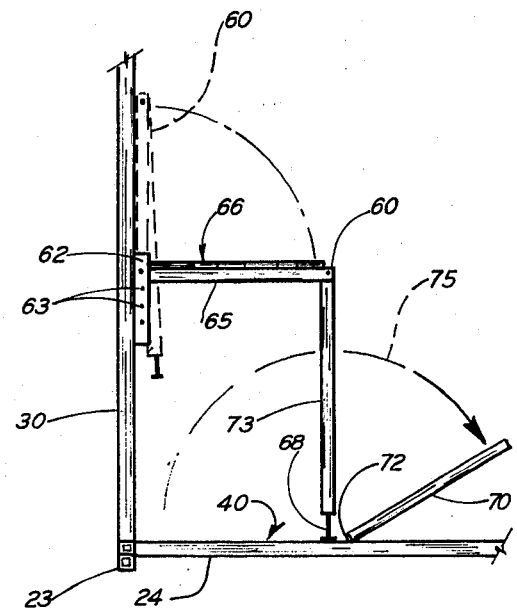
FIG. 4 is a partial schematic side view of the preferred embodiment of the apparatus of the present invention illustrating the seat and trap door portions thereof.

A door 52 is provided which is pivotally attached to vertical member 42, for example, using hinges 53, 54. This allows the operator a means to depart from apparatus 10 other than through opening 40. As will described more fully, a trap door 70 is pivotally attached being removably placed to cover or open opening 40 during operation. A seat assembly 60 (see FIG. 4) is movably attached to frame 20 between a folded position which allows an operator 12 to ascend or descend a tree 15. Seat assembly 60 can be folded into an operable position as shown in FIG. 4 with trap door 70 then being either closed or opened as desired with the seat being occupied by the user while hunting, or the like.

Blade assemblies 80, 90 are affixed rigidly to frame 20 and provide a means for structurally attaching frame 20 to tree 15. In combination with the blade assemblies 80, 90 attached to frame 20, the operator can use a foot-type stand climber 100 which can be attached to the feet of the operator by straps 101. (See, for example, U.S. Pat. No. 3,856,111 issued to James E. Baker, incorporated herein by referenced.)

In order to operate stand apparatus 10, the user would fold seat assembly 60 into the position shown in FIG. 1. Trap door 70 would then be opened as shown by the curved arrows in FIG. 1 allowing the operator to place the upper portion of his body through opening 40 and into the enclosure of frame 20.

The operator would then grip frame elements 25, 27 with his hands, adjacent the edges of opening 40. At the same time, the operator would affix to the tree by means known in the art the foot climber 100 and insert his feet into straps 101.

By lifting on frame 20 as illustrated in FIG. 1, the operator 12 would lift frame 20 upwardly as shown by the arrows in FIG. 1 gaining his support from foot climber 100. When he had reached a desired elevation, fully extending his legs, blade assemblies 80, 90 would support frame 20 due to the cantilevered weight distribution, causing blade assembly 90 to push against the proximate side of tree 15 adjacent stand 10 while blade assembly 80 would attach to the far side of tree 15 with this arrangement being further seen in FIG. 3.

In this manner, the operator could elevate the entire apparatus easily up the tree 15 for use. Once at a desired elevation, the operator would remove his feet from foot climber 100 and occupy the inside of frame 20 by standing on surface S which would cover the entire area within members 21-24. In FIG. 7 for purposes of illustration, surface S is shown only partially covering this area so as to expose the remaining elements for illustration.

FIG. 4 shows more particularly the construction of seat assembly 60 which is attached to bracket 62 at openings 63. A plurality of openings 63 allows seat surface 66 to be adjustably positioned. In combination with this adjustment, an adjustable foot 68 could be, for example, a threaded member which could be adjustably lengthened or shortened to keep seat surface 16 level depending upon the adjustment within opening 63. A pair of legs 73 would pivotally attach to seat frame 65 allowing the entire seat assembly 60 to be folded into the position shown in phantom lines in FIG. 4. In this manner, opening 40 would be cleared as well as a distance above opening 40 in a vertical direction which would allow operator 12 to lift the device as shown in FIG. 1.

Door 70 would be pivotally attached at 72 so that it could be opened or closed as shown by the curved arrow 75 in FIG. 4.

Figure 5:
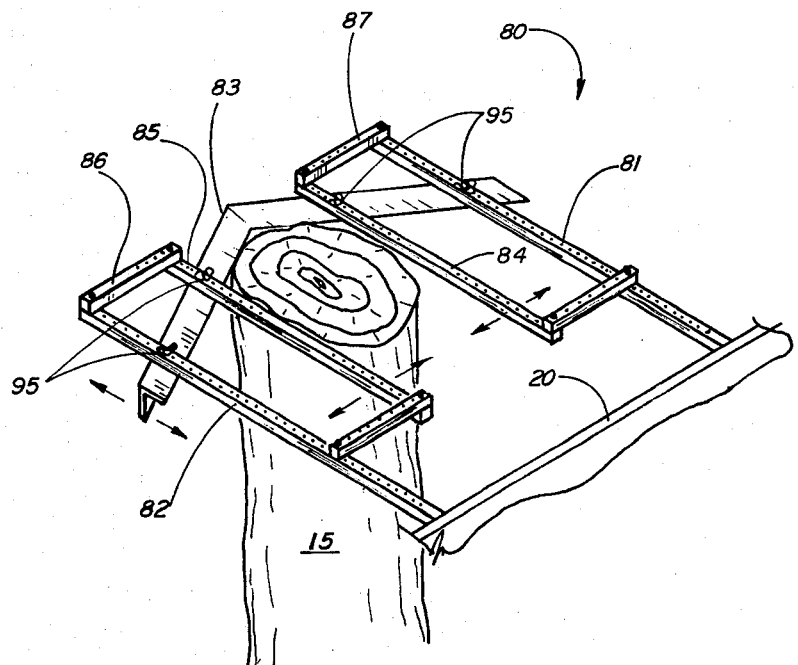
FIG. 5 is a partial perspective fragmentary view of the preferred embodiment of the apparatus of the present invention illustrating the upper climbing member portion thereof.

FIG. 5 shows more particularly the construction of blade assembly 80 which includes a blade 83 manufactured of angle iron or suitable structural material and a plurality of frame elements 81-82 and 84-87. Each frame element as shown in FIG. 5 could be provided with a plurality of openings drilled therethrough with fasteners such as bolted connections 95 passing through the openings in each member 81-87 to form an adjustable connection which would allow blade assembly 80 to be fitted to a tree 15 of substantially any diameter as long as it was strong enough to support apparatus 10.

Figure 3:
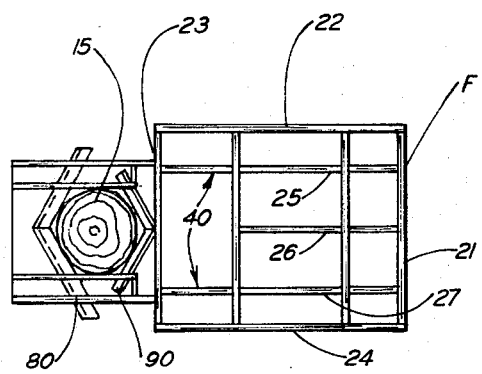
FIG. 3 is a top view of the preferred embodiment of the apparatus of the present invention with the covering portion removed.

Blade assembly 90 would be rigidly affixed to frame 20 by welding, for example, and would be angularly constructed as shown in FIG. 3 to index tree 15 thereagainst and bias it to a central position.

Blade 83 would similarly be of angular construction so as to index it against into a central position against tree 15.

Because many varying and different embodiments may be made within the scope of the inventive concept herein taught, and because many modifications may be made in the embodiments heretin detailed in accordance with the descriptive requirement of the law, it is to be understood that the details herein are to be interpreted as illustrative and not in a limiting sense. The invention is to be limited only by the scope of the claims appended hereto.

What is claimed as invention is:

1. An enclosed deer stand with tree climbing capability, comprising a covered frame forming:
   a. an enclosed stand having a top, bottom, and a plurality of side walls defining an enclosure therebetween, the rearmost of said side walls normally being adjacent a tree to which said frame is normally attached:
   b. an opening in said bottom;
   c. closure means for sealing said opening;
   d. a lower climbing bracket affixed to the tree and movable independently of the frame, positioned during operation directly below the opening so that a climber can stand on the lower climbing bracket and extend partially into the closure means, said lower climbing bracket including a tree gripping surface for transferring load to a tree at the surface thereof adjacent said frame and means for supporting the climber operatively connected to the tree gripping means for moving the tree gripping means up a tree by lifting force applied by the climber as he supports his upper body with the frame;
   e. an upper climbing bracket affixed to the top of the frame, said upper climbing bracket including an upper tree gripping surface for transferring load to a tree at the surface thereof opposite said frame; and
   f. means within reach of the climber operatively connected to the upper tree gripping means for moving the upper tree gripping surface up the tree by lifting force applied by the operator as he extends the distance between the upper and lower climbers.

2. The apparatus of claim 1 further comprising a folding seat pivotally affixed to said rearmost side wall.

3. The apparatus of claim 1 wherein said closure means is a trap door removably covering said opening.

4. The apparatus of claim 1 wherein said upper and lower climbing brackets are V-shaped, each providing a recess normally registering with the tree to which said frame attaches.

5. The apparatus of claim 1 wherein said top is movably attached to said frame.

6. The apparatus of claim 5 wherein the top is pivotally attached at one edge portion to one of said side walls at its upper edge.

7. The apparatus of claim 1 wherein the upper climbing bracket comprises in part a pair of spaced apart supportive sub-frames, each extending from a position adjacent the tree to which said frame attaches.

8. The apparatus of claim 7 wherein each of said sub-frames is generally rectangular.

9. The apparatus of claim 1 wherein the opening is generally adjacent said rearmost side wall.

10. The apparatus of claim 1 wherein the frame is covered in part by a normally permanent siding extending generally from said bottom upwardly a distance greater than one-half the height of said frame, and in part by a multi part fabric covering which parts can be laterally displaced to form openings therebetween.

* * * * *